United States Patent Office 3,270,836
Patented Sept. 6, 1966

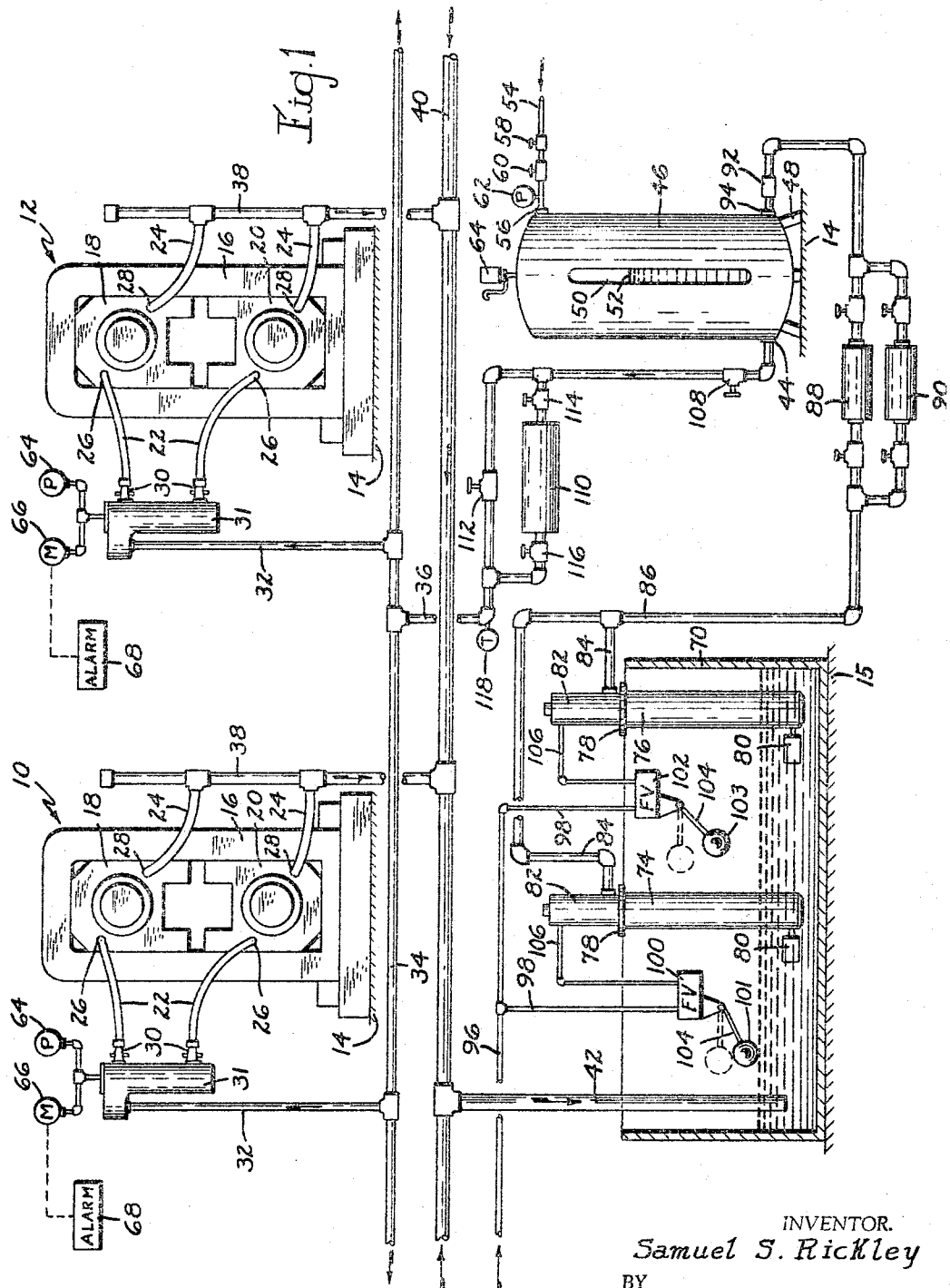

3,270,836
PRESSURIZED LUBRICATING SYSTEM
Samuel S. Rickley, West Boylston, Mass., assignor to Morgan Construction Company, Worcester, Mass., a corporation of Massachusetts
Filed Feb. 6, 1964, Ser. No. 342,966
2 Claims. (Cl. 184—6)

This invention relates to lubricating equipment and more particularly to an improved centralized system for delivering a continuous supply of lubricant to bearings and other various points of lubrication.

In any apparatus, proper lubrication of mechanical components such as bearings, gears, etc. is of primary importance if undue wear and frequent component replacements are to be avoided. Where large industrial installations are involved, it has frequently been found advisable to employ centralized lubricating systems wherein the lubricant is first pressurized by one or more feed pumps and thereafter distributed through a complex of feed pipes to the various components to be lubricated. These systems often include additional elaborate pumping and piping arrangements designed to return the oil from the lubricated components to the feed pumps in order to provide a continuous feed and return cycle.

As an illustration of the above and as an aid to the description of the applicant's invention, reference will hereinafter be made to a rolling mill. It should however be understood that the present invention is not restricted to industrial installations of this type and may be utilized wherever the use of centralized lubricating systems is deemed appropriate.

A rolling mill is usually provided with a single centrally located oil cellar which is rather large in size and positioned at the lowest part of the mill. Feed pumps installed at the receiving tank in the oil cellar operate through a feed piping system to deliver oil to a plurality of journal bearings throughout the mill. Having passed through the bearings, the oil is collected and carried back to the oil cellar by a return piping system. Where bearings are remotely positioned with respect to the oil cellar, return pumps are frequently added to overcome frictional resistance in the return piping.

Several rather significant disadvantages are inherent in a system of this type. For example, because of their large size, conventional oil cellars usually require extensive excavation during initial construction of the mill. Where bedrock is encountered as is frequently the case, proper positioning of the oil cellar at the lowest part of the mill often entails considerable expense. Moreover, the size and central positioning of the oil cellars usually results in many of the lubricating points being located at considerable distances therefrom. This in turn necessitates the addition of return pumps in order to provide a continuous feed and return cycle, a factor which further increases equipment and installation expenditures.

These disadvantages have been obviated in a novel manner by the applicant's invention, a general object of which is to provide an improved centralized lubricating system capable of delivering a continuous flow of lubricant to a plurality of remotely positioned bearings or other points of lubrication.

Another object of the present invention is to reduce equipment expenditures while increasing overall operational efficiency by avoiding the necessity of employing conventional feed pumps.

A further object of the present invention is to utilize a plurality of smaller sized oil sumps, thereby obviating the necessity of positioning large centralized oil receptacles such as oil cellars in the mill foundation.

Another object of the present invention is to provide an air operated lubricating system utilizing an enclosed pressurized tank as the primary feed means.

These and other objects of the present invention will become more apparent as the description proceeds with the aid of the accompanying drawing wherein;

FIG. 1 is a diagrammatic illustration of the applicant's apparatus installed adjacent roll stands in a rolling mill.

Referring now to the drawing, a portion of a conventional rolling mill pass line is shown embodying roll stands 10 and 12 mounted on the mill floor 14. Each stand is provided with a stationary housing structure 16 supporting spaced pairs of upper and lower roll neck bearings 18 and 20. Horizontally disposed work rolls (not shown) are journalled between upper and lower bearings 18 and 20 and are driven by conventional driving mechanisms to provide a means of continuously attenuating work pieces passing therebetween. The aforementioned combination of components is of course well known in the rolling art and is not considered as part of the present invention, but rather only as an illustration of a typical industrial installation wherein the applicant's apparatus may find use.

Each of the roll neck bearings 18 and 20 is lubricated by a continuous flow of pressurized oil and to this end is provided with feed and return hoses 22 and 24 connected thereto as at 26 and 28. Feed hoses 22 are in turn connected at their other ends to metering nozzles 30 being fed through strainers 31 by upstanding intermediate feed pipes 32. Intermediate feed pipes 32 are in turn connected to a common manifold feed line 34 being fed by main feed line 36.

In a similar manner, return hoses 24 are connected to upstanding return pipes 38 which lead through a common return manifold 40 to a single large diameter return pipe 42.

The aforementioned piping arrangement can of course be varied to accommodate any lubricating scheme requiring a constant flow of lubricant through any given component. Moreover, by extending both the feed and return manifolds 34 and 40 and by properly adjusting the various pipe sizes, any number of roll stands or other types of apparatus can be easily accommodated.

The means for providing a continuous flow of lubricant through the main feed and return lines 36 and 42 will now be described. Main feed line 36 is connected as at 44 to the lower end of an enclosed vessel herein shown for purposes of illustration in the form of an upstanding cylindrical tank 46 supported by legs indicated typically at 48 on the mill floor 14. The tank is additionally provided with a vertically disposed gauge glass 50 and is filled to a level indicated as at 52 with lubricating fluid. An air line 54 leading from any available source of pressurized air is then connected as at 56 to the upper portion of tank 46 and through the use of a constant pressure air regulator 58 and bleed valve 60, is utilized to provide a pressurized cushion of air above the lubricant in tank 46. Pressure indicator 62 is also connected to line 54 in order to provide operating personnel with a means of visually checking and adjusting the air pressure being fed into the tank. Moreover, as a safety precaution, a safety valve 64 is connected to the top of tank 46 and preset to open in the event that safe operating pressures are exceeded.

In view of the above, it can be seen that the lubricant contained within tank 46 is pressurized not by conventional feed pumps but rather through the use of air pressure acting within a confined space. By properly setting air regulator 58, a constant pressure is exerted on the lubricant contained within tank 46, thereby resulting in lubricant being supplied to metering nozzles 30 under a corresponding constant pressure. The metering nozzles 30 then serve to control the amount of lubricant being fed to the upper and lower roll neck bearings 18 and 20.

As a further precautionary measure, each of the strainers 31 is provided with a second pressure indicator 64 and a mercoid pressure switch 66 which is in turn electrically connected to an alarm 68. This of course provides operating personnel with a means of visually checking the pressure of lubricant being supplied to the metering nozzles 30 and in addition, serves to provide an immediated warning should the pressure drop below a predetermined level.

Having passed through the metering nozzles 30, the lubricant then proceeds at a controlled rate through feed hoses 22 to the bearings. Thereafter, the oil is carried by return hoses 24, return pipes 38 and return manifold 40 to a common downwardly disposed return pipe 42. The oil flowing downwardly through return pipe 42 is collected within a sump tank 70 positioned thereunder at any convenient place on a lower mill sub-floor 15.

The size of sump tank 70 will of course vary with the number of bearings or other lubricating points being serviced by the system. In addition, the overall shape of the tank can be varied to accommodate available space on the mill sub-floor which would otherwise go unused. It should however be understood that the sump tank 70 is in actually smaller than enclosed tank 46 and has been shown larger in the drawing only to facilitate illustration of the return pumps. Moreover, when conditions so dictate, the return system may be subdivided and several smaller sized sump tanks utilized with one enclosed tank 46 in order to take advantage of available space on the mill sub-floor 15. This of course is extremely advantageous in that heretofore wasted spaces can now be utilized as lubricant collection stations, thereby providing a marked advantage over conventional installations utilizing one centrally located large capacity oil cellar.

As shown in the drawing, sump tank 70 is provided with primary and secondary return pumps 74 and 76 depending from horizontally extending platforms 78 with their suction inlets 80 located beneath the level of lubricant collected within the tank. Either pump 74 or 76 is of sufficient capacity to handle the entire return load of the system. In this manner, the danger of shutting down the entire mill because of a single pump failure is avoided.

Both pumps 74 and 76 are powered by air operated motors 82 and are connected through intermediate discharge lines 84 to a common discharge line 86. Line 86, provided with both dual filters 88 and 90 suitably valved to permit alternate usage and a one-way check valve 92, is connected at its other end as at 94 to the lower portion of tank 46. Pump motors 82 are powered by air pressure again taken from any available source of pressurized air at the installation site.

To this end, compressed air is carried by line 96 through intermediate lines 98 to throttling type flow valves 100 and 102. The valves are adjusted by means of ball-type floats 101 and 103 operating through intermediate pivotal links 104 and designed to float on the surface of the lubricant contained within the tank. When the floats are pivoted to their lowest position, as is float 103 in the drawing, the valves to which they are connected are completely closed. As the level of the lubricant within the tank rises and engages the floats, the valves are gradually opened. This in turn results in compressed air being allowed to pass through the valves and connecting lines 106 to the air operated pump motors 82.

As shown in the drawing, the combination of valve 100 and its adjusting ball-type float 101 is positioned at a lower level in the tank than valve 102 and float 103. With this arrangement, float 101 will be contacted before float 103 by the rising lubricant in tank 70. This will in turn result in primary pump 74 being actuated prior to the auxiliary secondary pump 76. As illustrated in the drawing, the level of lubricant within the tank has risen to contact only float 101. Under these conditions, only primary pump 74 is operating to return lubricant to tank 46. Since either pump 74 or 76 is of sufficient capacity to carry the entire load of the system, under normal operating conditions the level of the fluid will be controlled only by float valve 101 and primary pump 74. However, should the primary pump demand repairs or replacement, it can be taken out of service and the level of lubricant within the tank allowed to rise until float 103 is contacted and the secondary pump 76 actuated. Thereafter, the level of lubricant within the sump tank will be controlled by operation of secondary pump 76.

Having thus described the principal components of the applicant's apparatus, its operation and the advantages derived therefrom will now be reviewed. In commencing operation of the applicant's apparatus, shut-off valve 108 in main feed line 36 is first closed and the pressurized receiving tank 46 filled to approximately two-thirds of its capacity with the lubricant. Air is then admitted to the tank through the constant pressure air regulating valve 58 which has been preset to operate at a constant pressure calculated to deliver lubricant through the feed pipe system to the metering nozzles 30. Once air pressure is built up within the upper unoccupied portion of tank 46, valve 108 is opened and lubricant begins to circulate through the upper and lower bearings 22 and 26 to thereafter return to sump tank 70. As the lubricant level in the sump tank rises, it eventually actuates float 101 of float valves 100, thereby actuating return pump 74. The pumping rate of the pump will of course be dependent upon the relative position of float 101 and will thus be synchronized with the flow rate of lubricant returning from the bearings to sump tank 70. Lubricant being discharged from the pumps will then be circulated through either filter 88 or 90 and thereafter returned to the pressurized receiving tank 46. Once in operation, the amount of oil being returned to tank 46 will be equal to the amount of oil leaving and thus very little air flow will be needed through regulating valve 58 in order to maintain the required constant pressure ahead of the metering nozzles. To prevent overheating of the lubricant caused by extended operation of the system, a cooler 110 has been connected to the main feed line 36 through the use of valves 112, 114 and 116. When the temperature level of the lubricant climbs above a predetermined level as indicated by temperature indicator 118, valve 112 is simply closed and valves 114 and 116 opened. This will cause the lubricant to circulate through cooler 110 and result in a corresponding lowering of its temperature.

Significant advantages are gained through the use of the apparatus as disclosed. For example, by substituting a pressurized receiving tank 46 for a second set of feed pumps as normally utilized in conventional installations, substantial savings in initial equipment expenditures are provided. Moreover, by avoiding the use of additional pumps, maintenance requirements are also minimized.

In addition, by utilizing smaller sized sump tanks located at advantageous positions on the mill sub-floor rather than the conventional large sized oil cellars, further savings are realized in the initial installation costs. Of additional importance is the feature of a self-modulating closed system made available through the combination of the air operated primary and secondary return pumps 74 and 76 and the float actuated throttle type flow valves 100 and 102. With this arrangement, a balance is achieved between the lubricant flow in the feed and return lines without requiring the constant attention of operating personnel.

It is my intention to cover all changes and modifications of the invention herein chosen for purposes of disclosure which do not depart from the spirit and scope of the invention.

I claim:
1. A lubricating system for forcing a lubricant continuously through a bearing comprising: a closed tank containing a supply of said lubricant; feed piping leading from said tank to said bearing; a source of pressurized gas connected to said tank, whereby the pressure in said tank will force said lubricant continuously into said bearing; a sump tank for receiving lubricant from said bearing; and, a pump operated by said source of pressurized gas for forcing lubricant from said sump tank back into said closed tank, thereby maintaining the supply of lubricant in said closed tank at a relatively constant level.

2. The apparatus as set forth in claim 1 further characterized by means responsive to the level of lubricant in said sump tank for controlling the operation of said pump.

References Cited by the Examiner

UNITED STATES PATENTS

| | | | |
|---|---|---|---|
| 934,953 | 9/1909 | Witt | 184—6 |
| 2,545,445 | 3/1951 | Chatterton | 137—563 |

OTHER REFERENCES

Labberton et al.: Marine Engineers' Handbook, McGraw-Hill, New York, 1945, VM 600 L 24, pp. 1300–1303 relied on.

LAVERINE D. GEIGER, *Primary Examiner.*

SAMUEL ROTHBERG, *Examiner.*

H. BELL, *Assistant Examiner.*